United States Patent
Hasegawa

(10) Patent No.: US 8,249,003 B2
(45) Date of Patent: Aug. 21, 2012

(54) RADIO COMMUNICATION TERMINAL, METHOD FOR SELECTING COMMUNICATION CHANNEL AND COMPUTER-READABLE STORAGE MEDIUM

(75) Inventor: Kazuhiko Hasegawa, Kakegawa (JP)

(73) Assignee: NEC Access Technica, Ltd., Shizuoka (JP)

( * ) Notice: Subject to any disclaimer, the term of this patent is extended or adjusted under 35 U.S.C. 154(b) by 680 days.

(21) Appl. No.: 12/399,686

(22) Filed: Mar. 6, 2009

(65) Prior Publication Data

US 2010/0226319 A1 Sep. 9, 2010

(30) Foreign Application Priority Data

Mar. 6, 2008 (JP) ................................. 2008-056947

(51) Int. Cl.
*H04W 4/00* (2009.01)
*H04W 72/00* (2009.01)
*H04B 7/216* (2006.01)

(52) U.S. Cl. ...... 370/329; 370/335; 455/450; 455/452.2

(58) Field of Classification Search .................. 370/328, 370/329, 335, 338, 340, 341; 455/450, 451, 455/452.1, 452.2, 453, 454, 462, 464, 509
See application file for complete search history.

(56) References Cited

U.S. PATENT DOCUMENTS

| | | | |
|---|---|---|---|
| 2005/0136933 A1* | 6/2005 | Sandhu et al. | 455/450 |
| 2005/0208956 A1* | 9/2005 | Takagi et al. | 455/464 |
| 2005/0277411 A1* | 12/2005 | Utsunomiya et al. | 455/434 |
| 2006/0176861 A1* | 8/2006 | Schmidt | 370/337 |
| 2006/0280153 A1* | 12/2006 | Kwon et al. | 370/338 |
| 2006/0280154 A1* | 12/2006 | Kwon et al. | 370/338 |
| 2006/0280155 A1* | 12/2006 | Kwon et al. | 370/338 |
| 2007/0060159 A1* | 3/2007 | Utsunomiya et al. | 455/450 |
| 2007/0183392 A1* | 8/2007 | Tandai et al. | 370/350 |

FOREIGN PATENT DOCUMENTS

| | | |
|---|---|---|
| JP | 8-84148 A | 3/1996 |
| JP | 2002-217917 A | 8/2002 |
| JP | 2002-300630 A | 10/2002 |
| JP | 2004-23143 A | 1/2004 |
| JP | 2004-274765 A | 9/2004 |
| JP | 2005-210616 A | 8/2005 |
| JP | 2005-354613 A | 12/2005 |
| JP | 2007-88517 A | 4/2007 |
| JP | 2007-96786 A | 4/2007 |
| JP | 2007-295541 A | 11/2007 |
| JP | 2008-507234 A | 3/2008 |
| JP | 2009-212968 A | 9/2009 |

* cited by examiner

*Primary Examiner* — Ricky Ngo
*Assistant Examiner* — Paul H Masur
(74) *Attorney, Agent, or Firm* — Sughrue Mion, PLLC

(57) ABSTRACT

A radio communication terminal includes a communication unit, a channel investigating unit and a channel setting unit. The communication unit communicates using at least one channel in a first frequency band. The channel investigating unit investigates all channels in the first frequency band, detects an available channel in the all channels and outputs a detection result as available channel information. The channel setting unit receives the available channel information, determines whether or not a plurality of channels adjacent to each other in the first frequency band are available for communication based on the available channel information.

22 Claims, 8 Drawing Sheets

RADIO COMMUNICATION TERMINAL, METHOD FOR SELECTING COMMUNICATION CHANNEL AND COMPUTER-READABLE STORAGE MEDIUM

RELATED APPLICATIONS

This application is based on Japanese Patent Application No. JP 2008-056947 filed on Mar. 6, 2008, and including a specification, claims, drawings and summary. The disclosure of the above Japanese Patent Application is incorporated herein by reference in its entirety.

TECHNICAL FIELD

The present invention relates to a radio communication terminal, a method for selecting a communication channel and a computer-readable storage medium.

BACKGROUND ART

In recent years, IEEE (Institute of Electrical and Electronics Engineers) 802.11n (draft version 2.0 and newer version) specification is proposed (drawn) as a standard which intends to increase capacity and communication speed of a wireless LAN (Local Area Network). IEEE802.11n realizes effective communication speed over 100 Mbps by using 2.4 GHz frequency band and 5 GHz frequency band. IEEE802.11n adopts a channel bonding technique in which a plurality of channels (bandwidth used for communication) is bonded as a technique to satisfy the above-mentioned specification. According to the channel bonding technique, a plurality of channels is bonded to broaden the bandwidth used simultaneously for radio communication from 20 MHz to 40 MHz, and consequently higher speed communication is realized.

While only bandwidth of 20 MHz (one channel) has been licensed by regulation of the radio law in Japan, the radio law has been amended in recent years to broaden the bandwidth used simultaneously for the radio communication from former 20 MHz to 40 MHz. That is, the channel bonding technique has become available in Japan.

In the channel bonding technique used by a general wireless LAN device based on the IEEE802.11n specification, two channels adjacent to each other are always bonded (for example, refer to Japanese Patent application Laid-Open No. 2008-507234).

Meanwhile, as the wireless LAN is widely spread in recent years, mutual interference between the wireless LAN devices causes new problems. That is, the mutual interference degrades throughput. Accordingly, various kinds of techniques which can reduce the mutual interference between the wireless LAN devices are proposed. For example, Japanese Patent Application Laid-Open No. 1996-84148 discloses a technique in which radiation in an unnecessary direction is suppressed through giving an antenna of a mobile station directivity and consequently interference with other station is suppressed. Japanese Patent Application Laid-Open No. 2004-274765 discloses a technique to select a channel having low-level interference. Japanese Patent Application Laid-Open No. 2007-96786 discloses that an appropriate criterion is made when a channel is selected. Japanese Patent Application Laid-Open No. 2007-295541 discloses a terminal device directly communicates with other terminal device using a different channel from a channel which is used for communication with a base station. Japanese Patent Application Laid-Open No. 2002-217917 discloses a method in which a multicast signal sent from a mobile station is analyzed. Japanese Patent Application Laid-Open No. 2005-210616 discloses a method in which communication starts shortly after an operation for communication.

SUMMARY

An exemplary object of the present invention is to provide a radio communication terminal, a method for selecting a communication channel and a computer-readable storage medium which can carry out high speed data communication having high quality and low-level radio-wave interference.

According to an exemplary aspect of the invention, a radio communication terminal includes a communication unit, a channel investigating unit and a channel setting unit. The communication unit communicates using at least one channel in a first frequency band. The channel investigating unit investigates all channels in the first frequency band, detects an available channel in the all channels and outputs a detection result as available channel information. The channel setting unit receives the available channel information, determines whether or not a plurality of channels adjacent to each other in the first frequency band are available for communication based on the available channel information, and sets a plurality of channels which are not adjacent to each other in the communication unit as channels which are available for communication in the first frequency band when it is determined that the plurality of channels adjacent to each other are not available for communication.

According to another exemplary aspect of the invention, a channel selecting method in a radio communication terminal which communicates using at least one channel in a first frequency band includes investigating all channels in the first frequency band, detecting an available channel in all channels and creating available channel information; determining whether or not a plurality of channels which are adjacent to each other in the first frequency band are available for communication based on the available channel information; and setting a plurality of channels which are not adjacent to each other as channels to be used for communication in the first frequency band when it is determined that the plurality of channels which are adjacent to each other cannot be used for communication.

According to another exemplary aspect of the invention, a channel selecting method in a radio communication terminal which communicates not only using at least one channel in a first frequency band but also using at least one channel in a second frequency band includes investigating all channels in the first and the second frequency bands, detecting an available channel in the all channels and creating available channel information; determining whether or not a plurality of channels which are adjacent to each other in one frequency band are available for communication based on the available channel information; and setting a plurality of channels which are not adjacent to each other in the one frequency band as channels to be used for communication, when it is determined that the plurality of channels which are adjacent to each other in the one frequency band of the first and the second frequency bands cannot be used for communication.

According to another exemplary aspect of the invention, a computer-readable storage medium stores instructions to enable a computer to carry out a channel selecting method installed in a radio communication terminal which communicates using at least one channel in a first frequency band. The method includes investigating all channels in the first frequency band, detecting an available channel in all channels and creating available channel information; determining whether or not a plurality of channels which are adjacent to each other in the first frequency band are available for communication based on the available channel information; and setting a plurality of channels which are not adjacent to each other as channels to be used for communication in the first frequency band when it is determined that the plurality of channels which are adjacent to each other cannot be used for communication.

According to another exemplary aspect of the invention, a computer-readable storage medium stores instructions to enable a computer to carry out a channel selecting method installed in a radio communication terminal which communicates not only using at least one channel in a first frequency band but also using at least one channel in a second frequency band. The method includes investigating all channels in the first and the second frequency bands, detecting an available channel in the all channels and creating available channel information; determining whether or not a plurality of channels which are adjacent to each other in one frequency band are available for communication based on the available channel information; and setting a plurality of channels which are not adjacent to each other in the one frequency band as channels to be used for communication, when it is determined that the plurality of channels which are adjacent to each other in the one frequency band of the first and the second frequency bands cannot be used for communication.

BRIEF DESCRIPTION OF THE DRAWINGS

Exemplary features and advantages of the present invention will become apparent from the following detailed description when taken with the accompanying drawings in which.

EXEMPLARY EMBODIMENTS

Initially, a problem of the previously mentioned channel bonding technique of the related art in the background art which a general wireless LAN device based on IEEE802.11n carries out and a problem which each related technique are described below. According to the channel bonding technique, two channels adjacent to each other are bonded together. Mutual interference has to be considered also in the channel bonding technique. Moreover, the number of channels of the wireless LAN is limited. When a large number of wireless LAN devices are arranged in a small office, it is difficult to select a channel having no interference. Therefore, it is all the more difficult to select two channels which satisfy the condition that the two channels adjacent to each other are able to avoid interference. That is, the channel bonding mentioned above (that is, bonding of the two channels adjacent to each other (referred to as combine thereof)) cannot take advantage of merits (high-speed communication using two channels) of IEEE802.11n.

Japanese Patent Application Laid-Open No. 1996-84148 discloses a technique which reduces interference. However, communication quality can be degraded, since a mobile station has a directional antenna in the technique. Therefore, the technique cannot take advantage of the merits IEEE802.11n. Moreover, it is necessary that a main station has a non-directional antenna and the mobile station has the directional antenna. As a result, such a configuration increases a cost.

Each of Japanese Patent Application Laid-Open No. 2004-274765, Japanese Patent Application Laid-Open No. 2007-96786 and Japanese Patent Application Laid-Open No. 2007-295541 discloses a technique to select one communication channel. However, each of the above techniques is not a technique which detects two channels having good communication environment when a bandwidth of 40 MHz is used based on IEEE802.11n.

Japanese Patent Application Laid-Open No. 2002-217917 discloses a technique in which a channel of a newly-installed access point does not interfere with an adjacent channel. However, the technique is not a technique which detects two channels having good communication environment based on IEEE802.11n.

Japanese Patent Application Laid-Open No. 2005-210616 discloses that when available channels exist in a plurality of different bands (5 GHz band and 2.4 GHz band), both 5 GHz band and 2.4 GHz band are used when a channel in which radar detection is unnecessary is selected. However, the patent document does not refer to the technique to detect two channels having good communication environment based on IEEE802.11n.

An embodiment of the present invention described hereinafter in detail with reference to a drawing settles the above-mentioned problem.

Figure 1:
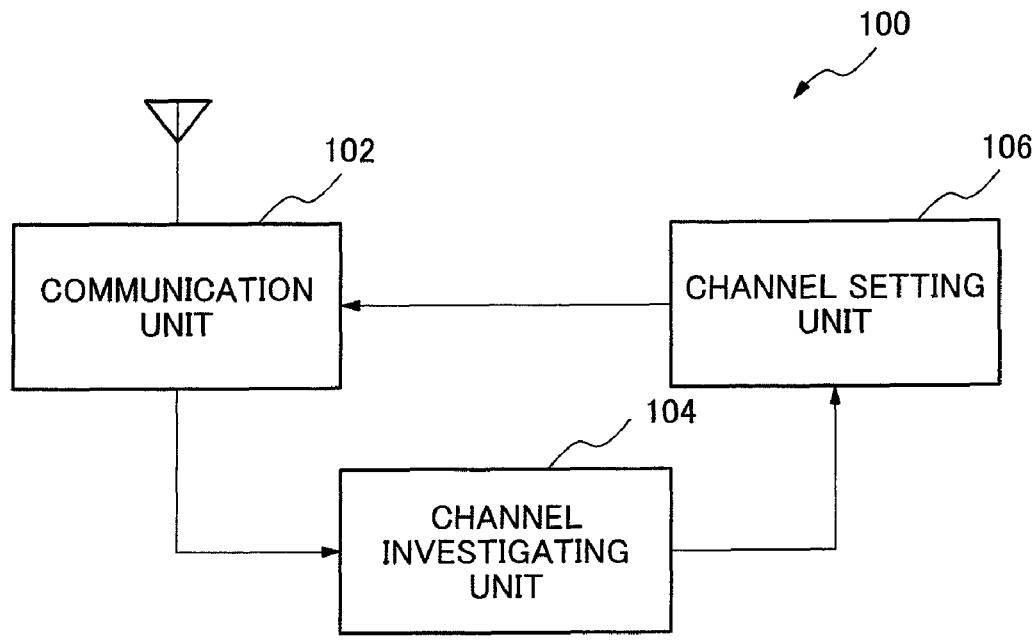
FIG. 1 is a block diagram showing an example of a configuration of a radio communication terminal of a first embodiment according to the present invention.

FIG. 1 is a block diagram showing a radio communication terminal 100 which is an example of a configuration of a first embodiment according to the present invention. The radio communication terminal 100 includes a communication unit 102, a channel investigating unit 104 and a channel setting unit 106. The communication unit 102 performs communication using at least one channel in a first frequency band (for example, either 2.4 GHz band or 5 GHz band).

The channel investigating unit 104 investigates all channels in the first frequency band, detects an available channel or channels in all the channels and outputs the detected result as available channel information.

On reception of the available channel information, the channel setting unit 106 determines whether or not a plurality of adjacent channels are available for communication in the first frequency band based on the available channel information. When it is determined that the plurality of adjacent channels are not available for communication, the channel setting unit 106 sets a plurality of channels which are not adjacent to each other in the communication unit 102 as a channel to be used for communication in the first frequency band.

That is, the radio communication terminal 100 may bond channels which are not adjacent to each other (that is, separated in the frequency band) depending on a usage state of a channel, while the general wireless LAN device based on IEEE802.11n specification always bonds two adjacent channels. Therefore, degree of freedom in selecting channels is improved. Probability to certainly select a plurality of channels having no radio interference in limited channels of the wireless LAN becomes high compared with the general channel bonding method above-mentioned, since the degree of freedom in selecting channels is improved. Therefore, the radio communication terminal 100 can carry out high speed data communication with low radio interference and high quality.

Further, when no available channel is found, the channel investigating unit 104 outputs information on a channel number of at least one channel having low noise-level as available channel information.

Figure 2:
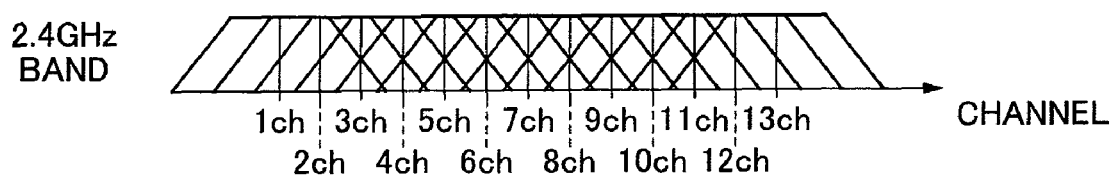
FIG. 2 shows an exemplified schematic diagram of a communication channel in the 2.4 GHz band for the radio communication terminal of the first embodiment.

FIG. 2 shows an example of communication channels in 2.4 GHz band of the radio communication terminal 100. FIG. 2 shows that thirteen channels are set at intervals of 5 MHz between 2400 MHz to 2438.5 MHz in the 2.4 GHz band. Each of 13 channels has a bandwidth of 20 MHz.

Figure 3:
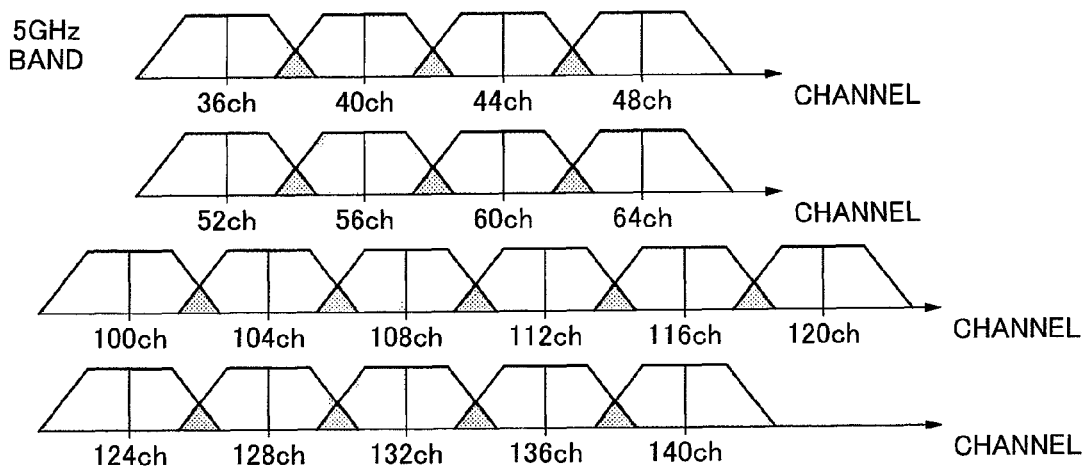
FIG. 3 shows an exemplified schematic diagram of a communication channel in the 5 GHz band for the radio communication terminal of the first embodiment.

FIG. 3 shows an example of communication channels in 5 GHz band of the radio communication terminal 100. FIG. 3 shows that nineteen channels each of which has a frequency bandwidth of 200 MHz are set in 5 GHz band. Specifically, four channels (channel number 36, 40, 44 and 48) are set at intervals of 20 MHz in 5.2 GHz band (5150 MHz to 5250 MHz). Four channels (channel number 52, 56, 60, and 64) are set at intervals of 20 MHz in 5.3 GHz band (5250 MHz to 5350 MHz). Moreover, eleven channels (channel number 100, 104, 108, 112, 116, 120, 124, 128, 132, 136 and 140) are set at intervals of 20 MHz in 5.6 GHz band (5470 MHz to 5725 MHz).

Figure 4:
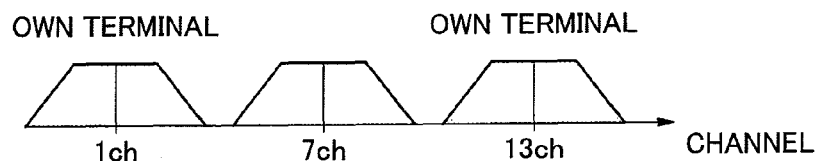
FIG. 4 shows a communication channel selecting method in a first frequency band (for example, 2.4 GHz band) for the radio communication terminal of the first embodiment.

FIG. 4 shows a communication channel selecting method in the first frequency band (hereinafter, 2.4 GHz band is exemplified) of the radio communication terminal 100 of the first embodiment. For example, if other wireless LAN device is using a channel of the channel number 7, the radio communication terminal 100 which carries out the channel bonding selects two separated channels (for example, two channels having channel numbers 1 and 13) as channels allocated in the terminal 100. As a result, it is possible to prevent mutual interference with the channel (that is, the channel of the channel number 7) which other wireless LAN device uses, and also it is possible to prevent degradation in communication quality of the terminal 100 and to increase communication speed.

In contrast, according to the channel bonding method which the general wireless LAN device based on IEEE802.11n specification, channels to be bonded are always two adjacent channels.

Here, two adjacent channels in 2.4 GHz band do not always mean two channels which are exactly adjacent to each other (for example, channels having channel numbers 1 and 2). Since frequency bandwidths of channels exactly adjacent to each other partly overlap each other in 2.4 GHz band, available channels are actually separated from each other by four channels (i.e. 20 MHz) in order to avoid interference. Specifically, in order to reduce interference with the channel of the channel number 1 null, for example, the channel of the channel number 6 is employed. Accordingly, two adjacent channels described below mean the nearest channels at least in consideration of inter-channel interference (for example, two channels separated from each other having four channels interval (four channels exist betwenn the two channels)).

Accordingly, as shown in FIG. 4, two channels adjacent to each other in 2.4 GHz band cannot be selected in view of inter-channel interference, while other wireless LAN device is using the channel of the channel number 7. That is, in such a case, high-speed communication using two channels cannot be performed. In other words, performance of a terminal is lowered.

On the other hand, for example, when a terminal selects channels of the channel numbers 1 and 4 by design in FIG. 4, the terminal can carry out high-speed communication using the two channels. However, since an interval of the channels is not sufficient to avoid interference (i.e. the interval of the channels is less than four channels), the inter-channel interference is unavoidable and communication quality may be degraded.

Figure 5:
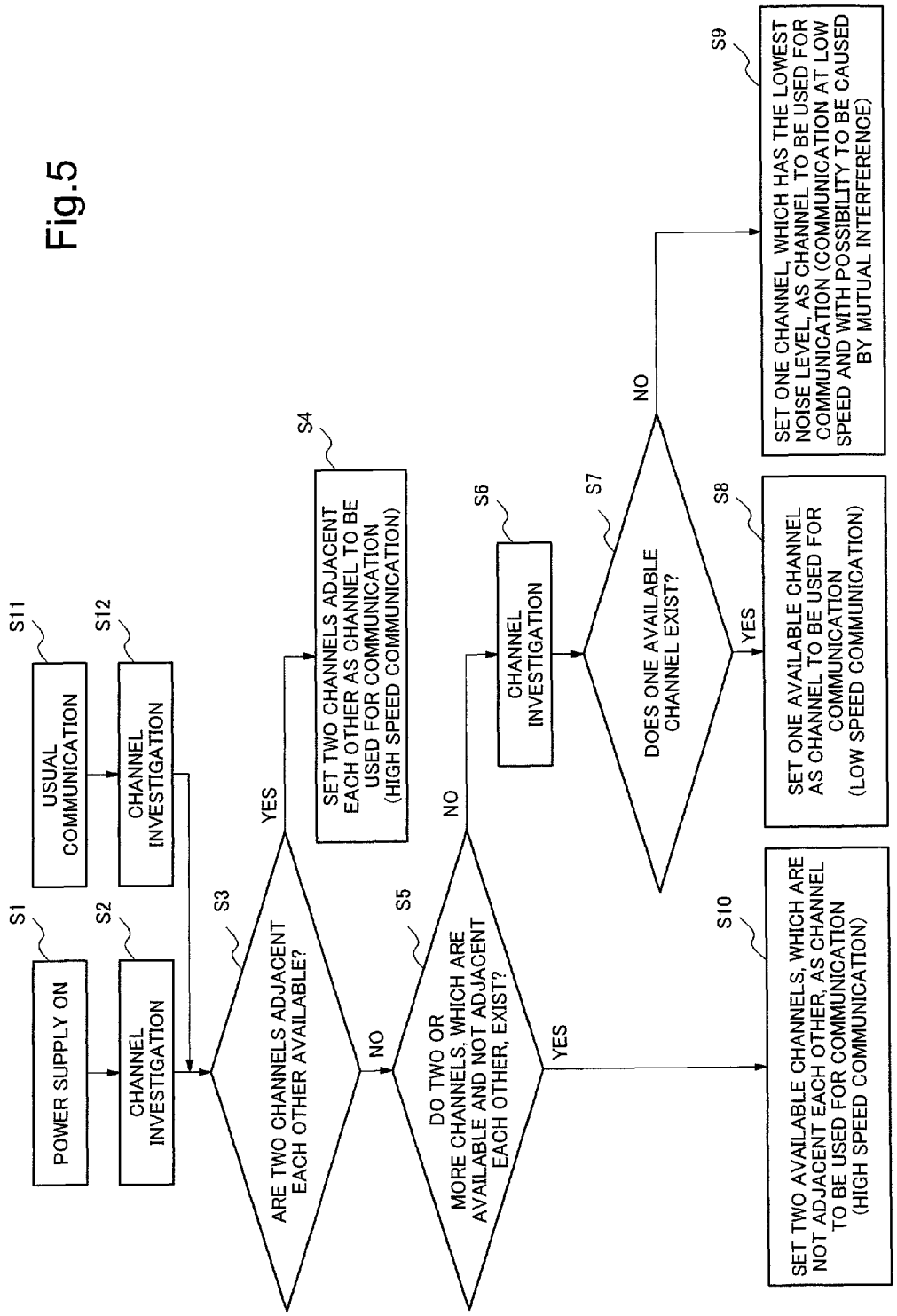
FIG. 5 is a flowchart showing an example of an operation of the radio communication terminal of the first embodiment.

FIG. 5 is a flowchart showing an example of an operation of the radio communication terminal 100 of the first embodiment described above. When a power supply of the radio communication terminal 100 is turned on (step S1), the channel investigating unit 104 investigates all channels in the first frequency band (for example, either 2.4 GHz band or 5 GHz band), detects an available channel in all the channels and outputs the detection result as available channel information (Step S2).

Here, the determination on the available channel performed by the channel investigating unit 104 includes, for example, a determination in which if noise level of a channel signal received by the communication unit 102 is equal to or lower than a predetermined threshold level of noise, a channel corresponding to the channel signal is available signal. Here, the available channel means the channel which not only is un-used but also has no interference with a surrounding channel in use. For example, when the first frequency band is 2.4 GHz band, the available channel information includes information such as the channel number 1, the channel number 6 and the channel number 11. In addition, the determination on the available channel might be done based on the interval of the channels, instead of the determination on the noise level of a channel signal.

The channel setting unit 106 receives the available channel information from the channel investigating unit 104, and determines whether or not two channels adjacent to each other in the first frequency band are available for communication based on the available channel information (Step S3).

Determining that the two channels adjacent to each other are available for communication (Yes in step S3), the channel setting unit 106 sets the two channels adjacent to each other in the communication unit 102 as channels to be used for communication in the first frequency band (Step S4). The channel setting unit 106 sets, for example, the channel number land the channel number 6 adjacent thereto. In this case, since the two channels are bonded, high-speed communication becomes possible. Moreover, since the channel number 1 is separated from the channel number 6 by four channels, mutual interference between the channels does not occur.

On the other hand, determining that the two channels adjacent to each other are not available for communication (No in step S3), the channel setting unit 106 determines whether or not two or more available channels which are not adjacent to each other exist based on the available channel information received from the channel investigating unit 104 (Step 5S).

When the channel setting unit 106 determines that the two or more available channels do not exist (No in step S5), the channel investigating unit 104 carries out the channel investigating process (step S6). Specifically, the channel investigating unit 104 investigates all channels in the first frequency band, detects the available channel in all the channels and outputs the detection result as the available channel information. The channel setting unit 106 determines whether or not one or no available channel exists in the first frequency band based on the available channel information (Step S7).

When one available channel exists (Yes in step S7), the channel setting unit 106 sets the one available channel in the communication unit 102 as the channel which is used for communication in the first frequency band (step S8). Then, while interference with surrounding other wireless LAN devices is avoided, communication speed becomes lower than that of communication in step S4 (i.e. communication speed realized by using two channels adjacent to each other) or that of communication in step S10 (i.e. communication speed realized by using two channels which are not adjacent to each other) since bandwidth corresponding to one channel is available for communication.

On the other hand, when no available channel exists (No in step S7), the channel setting unit 106 sets one channel which has the lowest noise level (that is, the least amount of interference) among all channels in the communication unit 102 as a channel which is used for communication in the first frequency band (Step S9). In such a case, communication speed is lower than those of communication in steps S4 and S10 since bandwidth corresponding to only one channel can be used. Moreover, since mutual interference is not completely avoided, it is estimated that performance becomes worse in comparison with communication in step S8 (communication using one channel without interference).

On the other hand, determining that two or more available channels which are not adjacent to each other exist (Yes in step S5), the channel setting unit 106 sets the two available channels which are not adjacent to each other in the communication unit 102 as channels to be used for communication in the first frequency band (step S10). Here, as an example of two available channels which are not adjacent to each other, combination of a channel of the channel number 1 and a channel of the channel number 11 which is not adjacent to the channel of the channel number 1 (that is, an interval of more than or equal to five channels is set) is exemplified. Since the two channels include no mutual interference, communication speed and communication quality which are equivalent to those of communication in step S4 (communication by using two channels adjacent to each other) becomes possible.

The radio communication terminal 100 of the first embodiment described above does not always bond two channels adjacent to each other but bonds channels which are not adjacent to each other (that is, separated) depending on a state of channel utilization in some cases, while according to the channel bonding method which general wireless LAN device based on IEEE802.11n specification adopts, the device always bonds two channels adjacent to each other. Therefore, degree of freedom in selecting channels is improved. Since the degree of freedom in selecting channels is improved, probability to certainly select a plurality of channels having no radio interference in a limited number of channels of the wireless LAN becomes high in comparison with the above-mentioned general channel bonding method. That is, the radio communication terminal 100 of the first embodiment can fully take advantage of merits of IEEE802.11n (high speed communication by using two channels). Therefore, the radio communication terminal 100 can carry out high speed data communication with a small amount of interference and with high quality.

Each process of steps S3 to S10 described above is not always performed while the power supply of the wireless LAN terminal 10 is turned on. For example, during communication (Step S11), steps S3 to S10 described above can be carried out after a channel investigation (step S12) is carried out by the channel investigating unit 104, as shown in FIG. 5.

According to the embodiment of the present invention described above, while the communication unit 102 of the terminal 100 communicates by using a plurality of channels, the channel investigating unit 104 may determine whether or not interfering radio wave exists in at least one of channels in use. When the channel investigating unit 104 determines that the interfering radio wave exists in at least one of channels in use, the channel setting unit 106 may stop using the channel in which the interfering radio wave is determined to exist based on a predetermined notification sent from the channel investigating unit 104 and may set a new channel having no interfering radio wave. Thus, even if a state of a radio wave changes, high speed communication of two channels can be continued with no suspending while quality is maintained.

Figure 6:
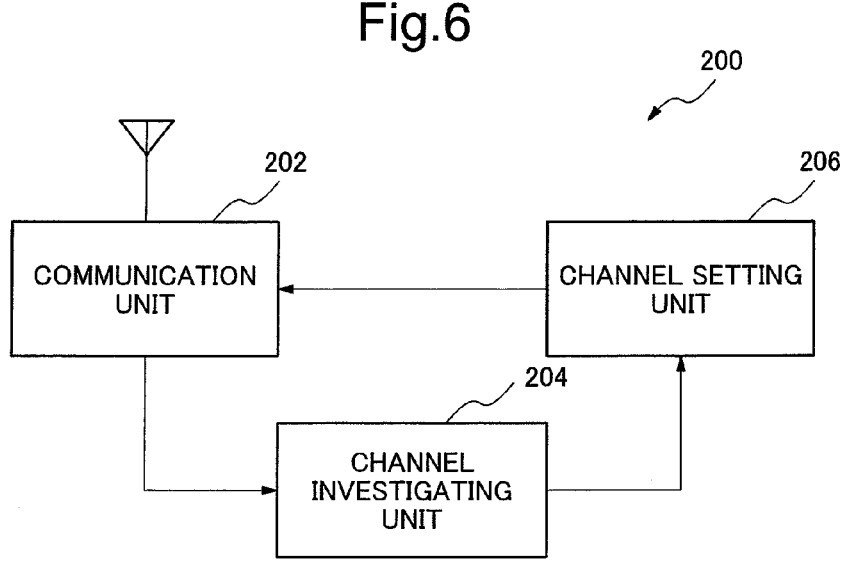
FIG. 6 is a block diagram showing an example of a configuration of a radio communication terminal of a second embodiment according to the present invention.

FIG. 6 is a block diagram showing a radio communication terminal 200 which is an example of a configuration of a second embodiment according to the present invention. The radio communication terminal 200 includes a communication unit 202, a channel investigating unit 204 and a channel setting unit 206. The communication unit 202 can perform communication by using least one channel in a second frequency band in addition to the first frequency band.

The channel investigating unit 204 investigates all channels in the first and the second frequency bands, detects an available channel in each of the first and the second frequency bands and outputs the detection result as available channel information. Further, when no available channel is detected, the channel investigating unit 204 outputs the number of at least one channel having a low noise level among the channels as the available channel information.

The channel setting unit 206 receives the available channel information and determines whether or not a plurality of channels which are adjacent to each other in the first and the second frequency bands are available for communication based on the available channel information. The channel setting unit 206 sets the channels to be used for communication in the first or the second frequency band in the communication unit 102 based on the determination. Here, determining that a plurality of channels adjacent to each other in each frequency band are not available for communication, the channel setting unit 206 selects one channel which has no interference with other channel per frequency band and sets the channels in the communication unit 202 as the channel to be used for communication in the first frequency band and the channel to be used for communication in the second frequency band.

Hereinafter, as a example, the first and the second frequency bands are assigned to 2.4 GHz band and 5 GHz band respectively. It is possible that the first and the second frequency bands are assigned to 5 GHz band and 2.4 GHz band respectively. The first and the second frequency bands are not limited to 2.4 GHz band and 5 GHz band respectively and other frequency bands are available. Further, with regard to 5 GHz band, it is assumed that the radio communication device 200 has a DFS (Dynamic Frequency Selection) function (not shown), in order to prevent interference with a meteorological radar, an aerial radar or a military radar.

Figure 7:
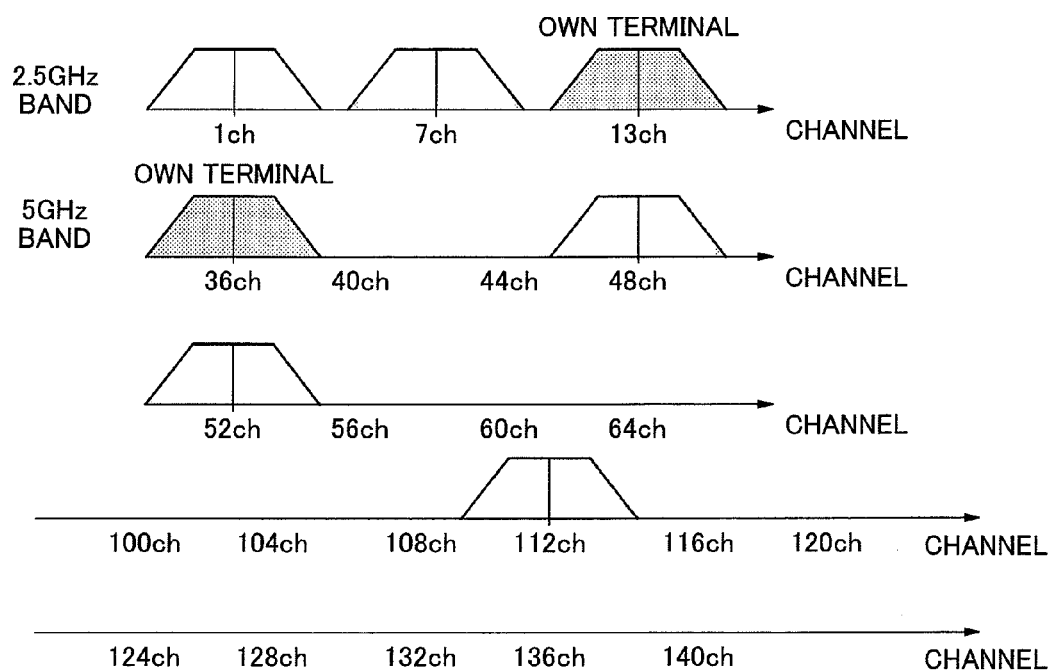
FIG. 7 shows a communication channel selecting method in the first frequency band (for example, 2.4 GHz band) and in a second frequency band (for example, 5 GHz band) for the radio communication terminal of the second embodiment.

FIG. 7 shows a communication channel selecting methods in the first frequency band (for example, 2.4 GHz band) and in the second frequency band (for example, 5 GHz band) according to the second embodiment of the present invention.

For example, when other wireless LAN device already uses channels having channel numbers 1 and 7 in 2.4 GHz band and uses channels having channel numbers 48, 52 and 112 in 5 GHz band, the radio communication terminal 200 which carries out the channel bonding method selects one channel which has no interference with channels having the channel numbers from channels in each frequency band (for example, a channel whose channel number is 13 in 2.4 GHz band and a channel whose channel number is 36 in 5 GHz band)

Thus, when an available channel (channel which not only is un-used but also has no interference with surrounding channels even if the channel is used) is selected in each of different frequency bands and the selected channels are bonded, it becomes possible to prevent mutual interference with channels which other wireless LAN devices use, and also it becomes possible to prevent degradation of communication quality and to carry out high speed communication.

Figure 8:
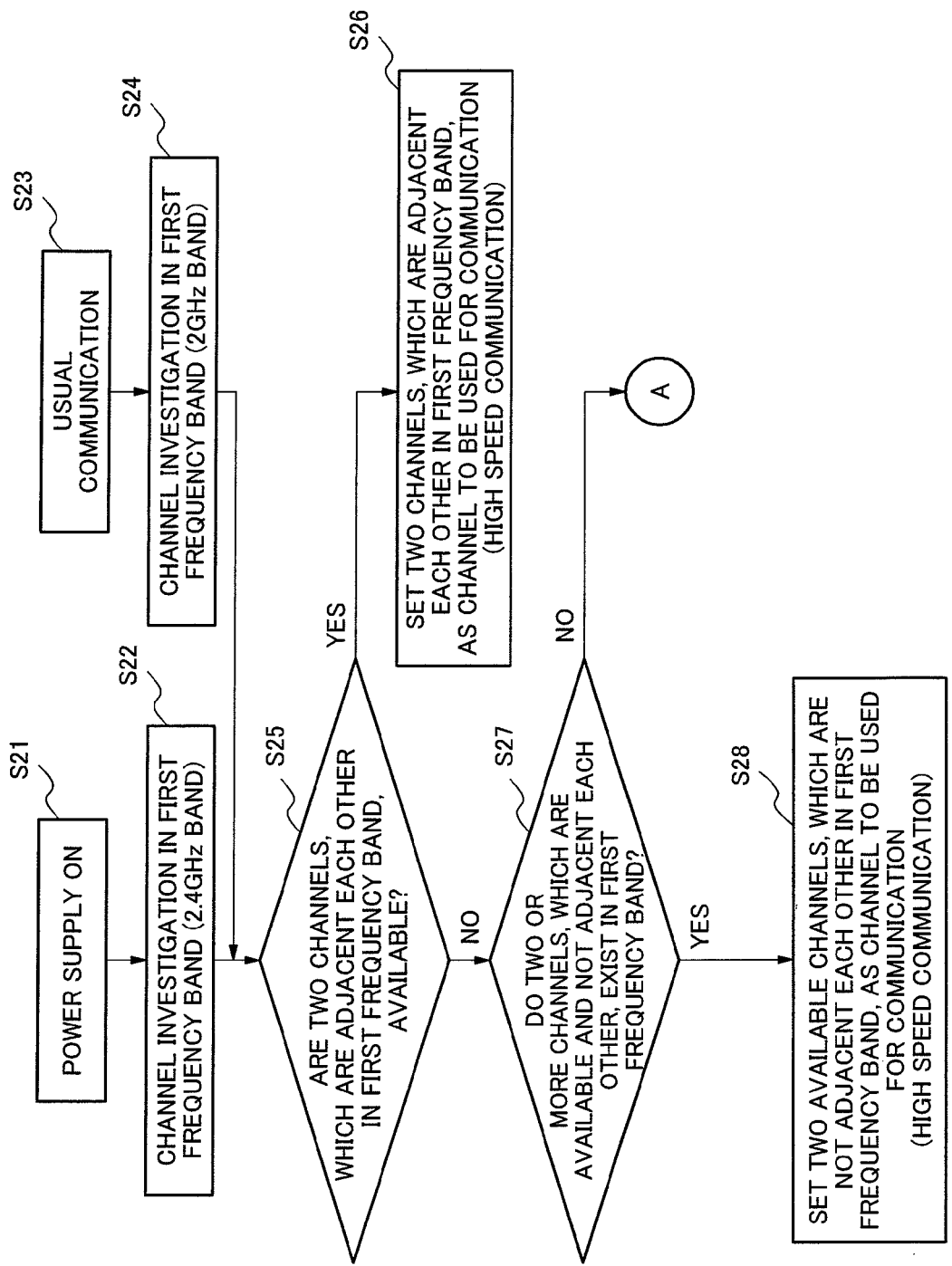
FIGS. 8 to 10 are flowcharts showing an example of an operation of the radio communication terminal of the second embodiment.
Figure 9:
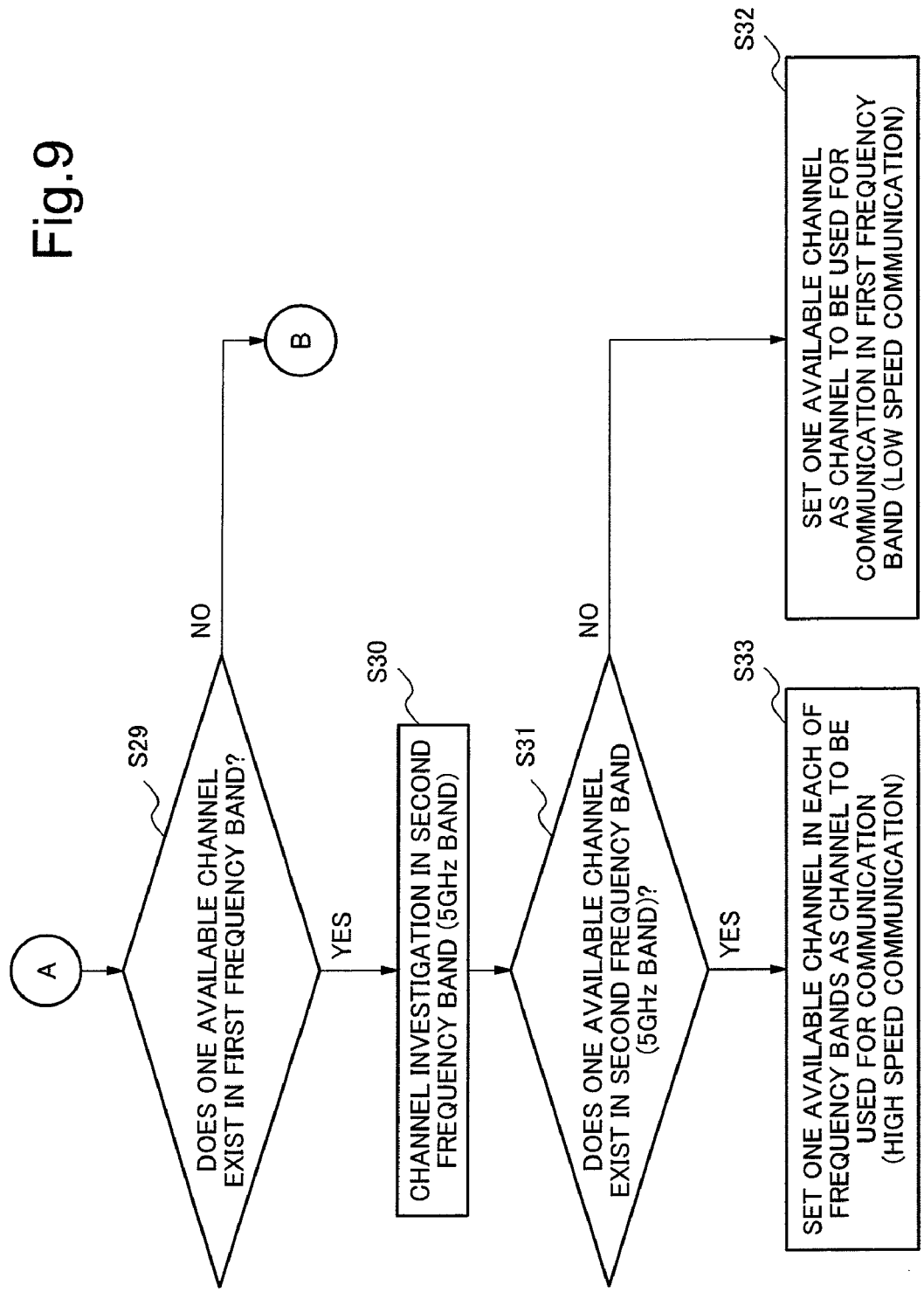
Figure 10:
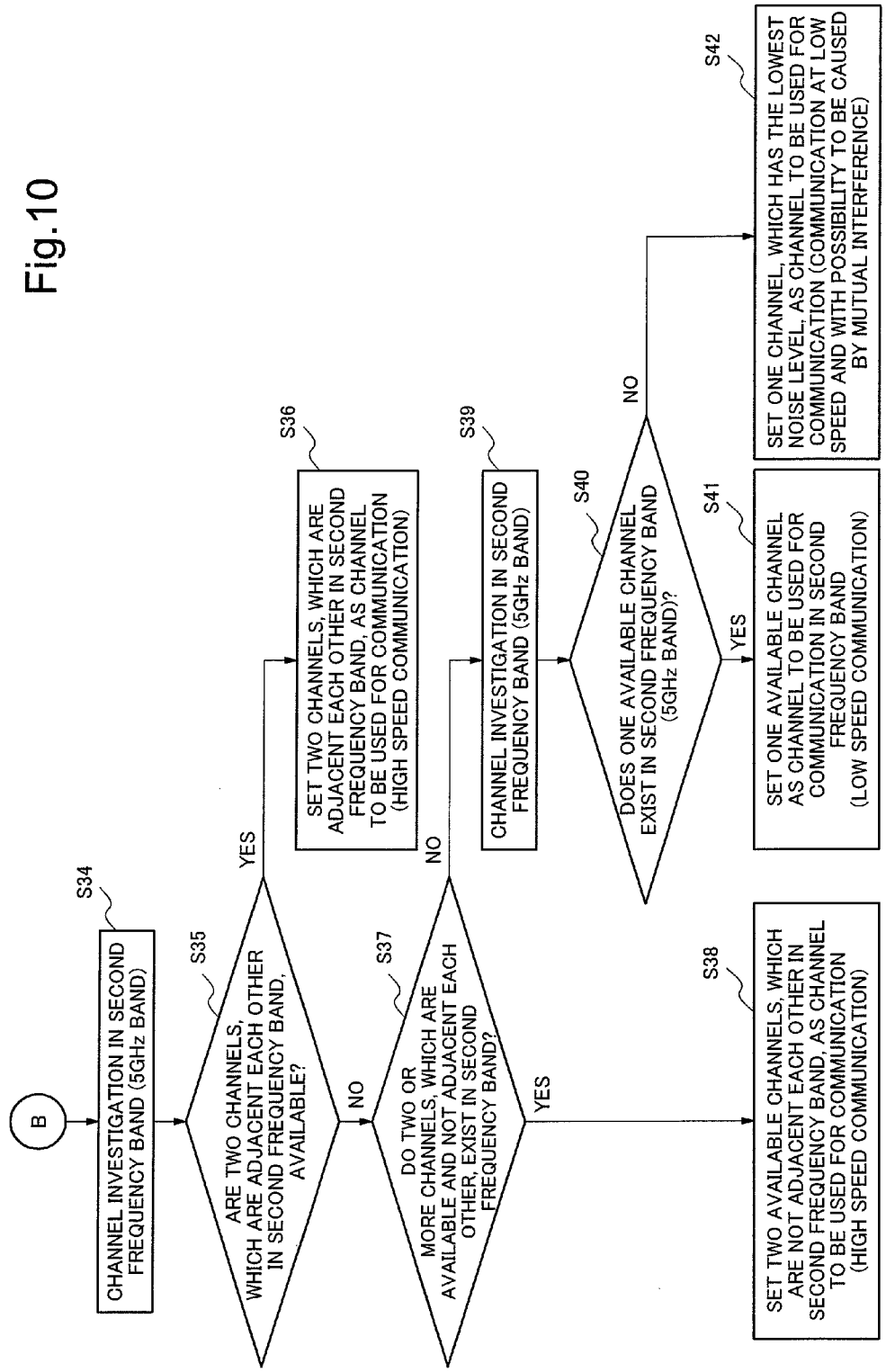

FIGS. 8 to 10 are flowcharts showing an example of operation of the radio communication terminal 200 of the second embodiment described above. When a power supply of the radio communication terminal 200 is turned on (step S21), the channel investigating unit 204 investigates all channels in the first frequency band (2.4 GHz band is exemplified in the embodiment of the present invention), detects an available channel in all the channels and outputs the detection result as the available channel information (step S22). Moreover, during communication (step S23), the channel investigating unit 204 carries out the same channel investigating process as step S22 (step S24).

The channel setting unit 206 receives the available channel information from the channel investigating unit 204, and determines whether or not two available channels adjacent to each other in the first frequency band exist based on the available channel information (Step S25).

Determining that two available channels adjacent to each other exist in the first frequency band (Yes in step S25), the channel setting unit 106 sets the two channels adjacent to each other in the communication unit 202 as channels to be used for communication in the first frequency band (Step S26). For example, the channel setting unit 206 sets a channel having the channel number 1 and a channel having the channel number 6 which is adjacent to the channel having the channel number 1. Then, since the two channels are bonded together, it becomes possible to communicate at high speed. Moreover, in this case, since the two channels having the channel number 1 and the channel number 6 are located at interval of four channels, mutual interference is not generated. Further, if the first frequency band corresponds to 5 GHz band, in order to prevent interference with a meteorological radar, an aerial radar or a military radar, the channel investigating unit 204 carries out a process of searching existence of a radar wave by using the above mentioned DFS function in addition to the above mentioned channel investigating process.

On the other hand, determining that the two channels adjacent to each other in the first frequency band can not be used (No in step S25), the channel setting unit 206 determines whether or not two or more available channels which are not adjacent to each other exist in the first frequency band based on the available channel information received from the channel investigating unit 204 (Step S27).

Determining that two or more available channels which are not adjacent to each other exist in the first frequency band (Yes in step S27), the channel setting unit 206 sets the two available channels which are not adjacent to each other in the communication unit 202 as channels to be used for communication in the first frequency band (step S28). Since the two channels have no mutual interference, communication speed and communication quality which are equivalent to those of communication in step S26 (communication by using two channels adjacent to each other) become possible.

When the channel setting unit 206 determines that two or more available channels which are not adjacent to each other do not exist (No in step S27) in the first frequency band, the channel investigating unit 204 carries out the channel investigating process (not illustrated). Specifically, the channel investigating unit 204 investigates all channels in the first frequency band, detects an available channel in all the channels in the first frequency band and outputs the detection result as the available channel information. The channel setting unit 206 determines whether or not one or no available channel exists in the first frequency band based on the available channel information (step S29 in FIG. 9).

When no available channel exists in the first frequency band (No in step S29), the channel investigating unit 204 carries out a process of the channel investigation (step S34 in FIG. 10) in the second frequency band (5 GHz band is exemplified in the embodiment of the present invention). Specifically, the channel investigating unit 204 investigates all channels in the second frequency band, detects an available channel in all the channels and outputs the detection result as the available channel information. The channel setting unit 206 determines whether or not two available channels adjacent to each other exist in the second frequency band based on the available channel information (step S35).

Determining that the two available channels adjacent to each other exist in the second frequency band (Yes in step S35), the channel setting unit 206 sets the two available channels which are adjacent to each other in the communication unit 202 as channels to be used for communication in the second frequency band (step S36). In such a case, since the two channels are bonded together, it is possible to communicate at high speed. Further, mutual interference is not generated.

On the other hand, determining that two available channels adjacent to each other do not exist in the second frequency band (No in step S35), the channel setting unit 206 determines whether or not two or more channels which are not adjacent to each other exist in the second frequency band based on the available channel information received from the channel investigating unit 204 (Step S37).

When the channel setting unit 206 determines that two or more available channels which are not adjacent to each other do not exist in the second band (No in step S37), the channel investigating unit 204 carries out the channel investigating process (step S39) Specifically, the channel investigating unit 204 investigates all channels in the second frequency band, detects an available channel in all the channels and outputs the detection result as the available channel information. The channel setting unit 206 determines whether or not one or no available channel exists in the second frequency band based on the available channel information (step S40).

When one available channel exists in the second frequency band (Yes in step S40), the channel setting unit 206 sets the one available channel in the communication unit 202 as a channel to be used for communication in the second frequency band (step S41). In this case, while interference with surrounding other wireless LAN devices is avoided, communication speed is lower than that of step S36 (communication speed realized by using two channels adjacent to each other) and that of step 38 (communication speed realized by using two channels which are not adjacent to each other), since bandwidth corresponding to only one channel is used for communication.

On the other hand, when no available channel exists in the second frequency band (No in step S40), the channel setting unit 106 sets one channel which includes the lowest noise level among all channels in the first and the second frequency bands in the communication unit 202 as a channel which is used for communication (step S42). In this case, communication speed is lower than those in steps S36 and S38 since bandwidth corresponding to only one channel can be used. Moreover, since mutual interference is not completely avoided, it is estimated that performance becomes worse in comparison with communication in step S41 (communication without interference by using one channel).

On the other hand, determining that two or more available channels which are not adjacent to each other exist in the second frequency band (Yes in step S37), the channel setting unit 206 sets the two available channels which are not adjacent to each other in the communication unit 202 as channels which is used for communication in the second frequency band (step S38). In this case, since the two channels include no mutual interference, communication speed and communication quality which are equivalent to those of communication in step S36 (communication by using two channels adjacent to each other) become possible.

When the channel setting unit 206 determines one available channel exists in the first frequency band (Yes in step S29 in FIG. 9), the channel investigating unit 204 carries out a process of the channel investigation in the second frequency band (step S30). Specifically, the channel investigating unit 204 investigates all channels in the second frequency band, detects an available channel in all the channels and outputs the detection result as the available channel information. The channel setting unit 206 determines whether or not one or no available channel exists in the second frequency band based on the available channel information (step S31).

When no available channel exists in the second frequency band (No in step S31), the channel setting unit 206 sets one available channel in the first frequency band in the communication unit 202 as a channel which is used for communication (step S32). Then, while interference with surrounding other wireless LAN devices is avoided, communication speed becomes lower than that of step S26 (communication speed realized by using two channels adjacent to each other) or that of step 28 (communication speed realized by using two channels which are not adjacent to each other), since bandwidth corresponding to only one channel can be used for communication.

When one available channel exists in the second frequency band (Yes in step S31), the channel setting unit 206 sets one available channel in each of the first and the second frequency bands in the communication unit 202 as channels to be used for communication (step S33). In this case, the two channels are not adjacent to each other and are not includes in the same frequency band, but the two channels have no mutual interference. Accordingly, communication quality and communication speed equivalent to those of step S36, for example, (communication by using two channels adjacent to each other in the same frequency band) become possible.

As described above, according to the second embodiment of the present invention, in particular, when two available channels (both two channels adjacent to each other and two channels not adjacent to each other are possible) in the same frequency band are not found, the radio communication terminal 200 bonds each available channel in each of the different frequency bands. Therefore, degree of freedom in selecting the channel is improved. Since the degree of freedom in selecting channel is improved, probability to certainly select a plurality of channels having no radio interference in a limited number of channels of the wireless LAN becomes high in comparison with above-mentioned common channel bonding method. Specifically, since 5 GHz band as the second frequency band includes nineteen channels, probability to select two channels having no interference becomes high compared with the channel selection using only 2.4 GHz band as the first frequency band.

That is, the radio communication terminal 200 according to the second embodiment of the present invention can fully take advantage of merits (high speed communication by two channels) of IEEE802.11n. Therefore, the radio communication terminal 200 can carry out high speed data communication with a small amount of interference and with high quality.

Further, 2.4 GHz band is assigned to the first frequency band and 5 GHz band is assigned to the second frequency band, according to the second embodiment of the present invention. Moreover, the channel investigating process in the first frequency band, that is 2.4 GHz band, is carried out at first, according to the second embodiment of the present invention. However, order of the channel investigation is not limited to the example mentioned above.

Figure 11:
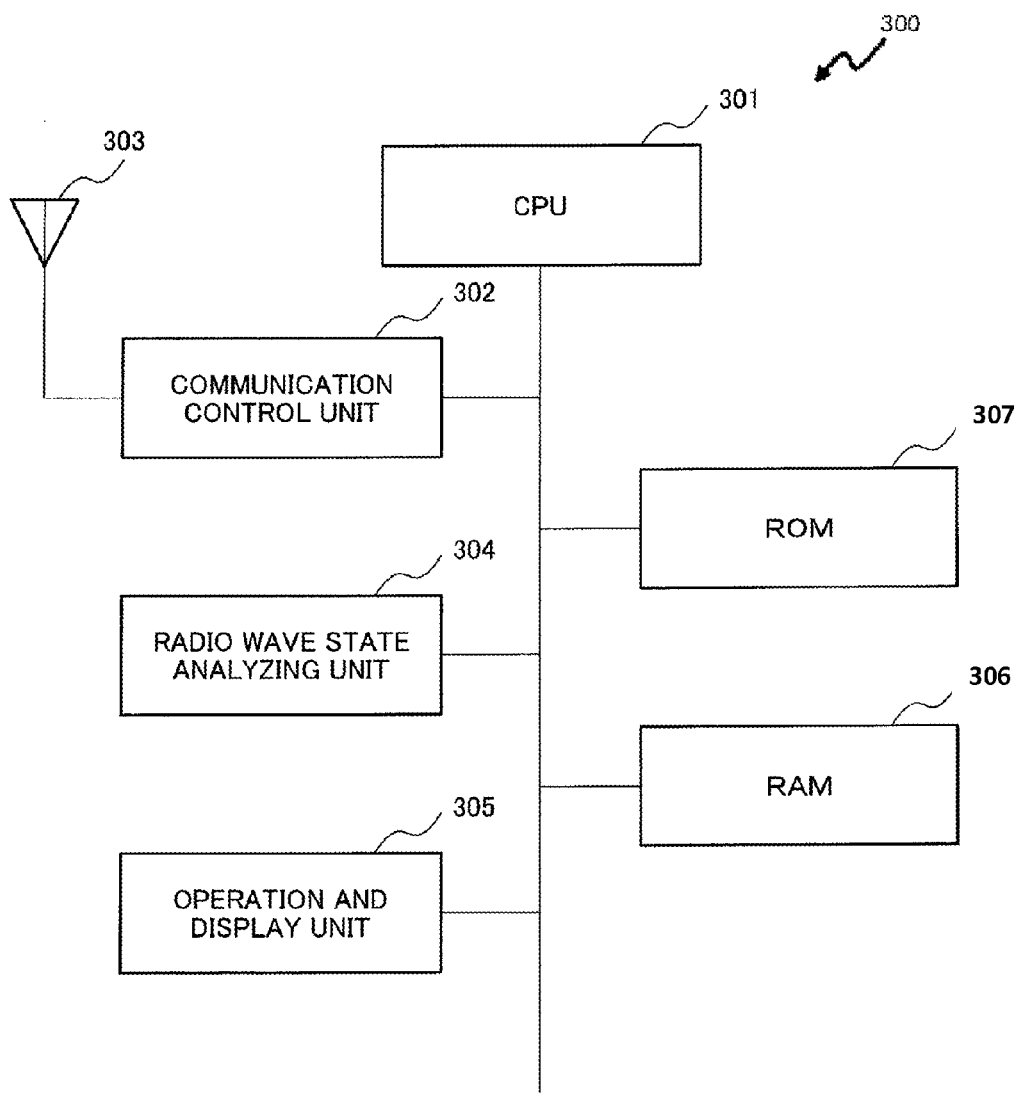
FIG. 11 is a block diagram showing an example of a configuration of a radio communication terminal of a third embodiment according to the present invention.

FIG. 11 is a block diagram showing a radio communication terminal 300 which is an example of a configuration of a third embodiment according to the present invention. The radio communication terminal 300 includes a CPU (Central Processing Unit) 301, a communication control unit 302, an antenna 303, a radio wave state analyzing unit 304, an operation and display unit 305, a RAM (Random Access Memory) 306 and a ROM (Read Only Memory) 307.

CPU 301 controls the whole of the radio communication terminal 300. The communication control unit 302 controls wireless communication in a first frequency band (for example, 2.4 GHz band) and a second frequency band (for example, 5 GHz band). The antenna 303 sends and receives a radio wave. The radio wave state analyzing unit 304 analyzes data obtained through channel search and a channel monitor and checks a state of a surrounding radio wave such as a noise level. The operation and display unit 305 is handled by a user and displays required data. RAM 306 is a memory for operation. ROM 307 is a memory which stores a program or the like.

CPU 301 receives surrounding radio wave state information from the radio wave state analyzing unit 304 and executes a program stored in the ROM 307. Specifically, for example, the CPU 301 determines whether or not a plurality of channels which are adjacent to each other in the first frequency band are available for communication based on the information. Determining that the plurality of channels adjacent to each other are not available for communication, CPU 301 sets a plurality of channels which are not adjacent to each other in the communication control unit 302 as channels to be used for communication in the first frequency band.

Determining that it is impossible to use a plurality of channels adjacent to each other in the same frequency band, CPU 301 selects at least one channel in each of the first and the second frequency bands, and sets the channels in the communication control unit 302 as channels which is used for communication.

Further, the channel setting result is displayed on the operation and display unit 305 by the CPU 301.

Each process shown in the flowchart in FIG. 5 or each process shown in flowcharts in FIGS. 8 to 10 is programmed to be stored in ROM 307. Then, CPU 301 can execute the program. Thus, the aforementioned configuration according to the third embodiment of the present invention can carry out functions equivalent to functions of the configuration according to the first or the second embodiments of the present invention. Further, a storage medium which stores the above-mentioned program is not limited to the ROM 307. The above-mentioned program may be stored in other storage medium, for example, a semiconductor memory apparatus, an optical or magnetic storage device, a various kinds of removal storage media or the like.

A radio communication system of a fourth exemplary embodiment according to the present invention allows a plurality of radio communication terminals to communicate within a predetermined communication area by selectively using a plurality of channels in a first predetermined band and specifically to communicate at high speed by using two channels which are adjacent to each other. The radio communication terminal includes a monitoring means which monitors a state of a surrounding radio wave, a determining means which determines whether or not two consecutive channels in frequency domain can be used based on the monitoring result on the state of the radio wave, a selection means which selects two separate channels when the determining means determines that the two consecutive channels cannot be used and a selective communication means which communicates by using the two separate channels which are selected by the selection means.

In a radio communication system of a fifth exemplary embodiment according to the present invention, the plurality of radio communication terminals include a communication means which communicates by selectively using a plurality of channels in a second predetermined band. The selection means selects two separate channels each of which are located in the first predetermined band and the second predetermined band respectively.

In a radio communication system of a sixth exemplary embodiment according to the present invention, the radio communication terminal includes a communication control means which transfers communication to a channel having no interfering radio wave to maintain the communication when the determining means determines that the interfering radio wave exists in at least one of two channels during communication using the two channels,.

In a radio communication system of a seventh exemplary embodiment according to the present invention, the radio communication terminal is a 2 GHz band wireless LAN terminal having a function to communicate with 40 MHz bandwidth, based upon IEEE802.11n specification (draft version 2.0 and newer version).

In a radio communication system of a eighth exemplary embodiment according to the present invention, the radio communication terminal is a 2 GHz/5 GHz bands wireless LAN terminal having a function to communicate with 40 MHz bandwidth based upon IEEE802.11n specification (draft version 2.0 and newer version).

A radio communication terminal of a ninth exemplary embodiment according to the present invention communicates within a predetermined communication area by selectively using a plurality of channels in a first predetermined band and specifically, communicates at high speed by using two channels which are adjacent to each other. The radio communication terminal includes the monitoring means which monitors a state of a surrounding radio wave, the determining means which determines whether or not two consecutive channels can be used based on the monitoring result on the state of the radio wave, the selection means which selects two separate channels when the determining means determines that the two consecutive channels cannot be used and the selective communication means which communicates by using the two separate channels which are selected by the selection means.

A radio communication terminal of a tenth exemplary embodiment according to the present invention includes the communication means which communicates by selectively using a plurality of channels in a second predetermined band. The selection means selects two separate channels each of which are located in the first predetermined band and the second predetermined band respectively.

A radio communication terminal of an eleventh exemplary embodiment according to the present invention includes the communication control means which transfers communication to a channel having no interfering radio wave to maintain the communication when the determining means determines that the interfering radio wave exists in at least one of two channels during communication by using the two channels.

A radio communication terminal of a twelfth exemplary embodiment according to the present invention is a 2 GHz band wireless LAN terminal having a function to communicate with 40 MHz bandwidth based upon IEEE802.11n specification (draft version 2.0 and newer version).

A radio communication terminal of a thirteenth exemplary embodiment according to the present invention is a 2 GHz band/5 GHz band wireless LAN terminal having a function to communicate with 40 MHz bandwidth based upon IEEE802.11n specification (draft version 2.0 and newer version).

A method for selecting a communication channel which the radio communication terminal uses, of a fourteenth exemplary embodiment according to the present invention is a method in which communication is carried out within a predetermined communication area by selectively using a plurality of channels in a first predetermined band, and in which the communication is carried out at high speed by using two consecutive channels. The method includes a step to monitor a state of a surrounding radio wave, a step to determine whether or not the two consecutive channels can be used based on the monitoring result on the state of the radio wave, a step to select two separate channels when it is determined that the two consecutive channels cannot be used and a step to communicates by using the two separate channels.

A method for selecting a communication channel which the radio communication terminal uses, of a fifteenth exemplary embodiment according to the present invention includes a step to communicate by selectively using a plurality of channels in a second predetermined band and a step to select two separate channels each of which are located in the first predetermined band and the second predetermined band respectively.

A method for selecting a communication channel which the radio communication terminal uses, of a sixteenth exemplary embodiment according to the present invention includes a step to transfer communication to a channel having no interfering radio wave to maintain the communication when the determining means determines that the interfering radio wave exists in at least one of two channels during the communication by using the two channels.

In a method for selecting a communication channel which the radio communication terminal uses, of a seventeenth exemplary embodiment according to the present invention, the radio communication terminal is a 2 GHz band wireless LAN terminal which has a function to communicate with 40 MHz bandwidth based upon IEEE802.11n specification (draft version 2.0 and newer version).

In a method for selecting a communication channel which the radio communication terminal uses, of a eighteenth exemplary embodiment according to the present invention, the radio communication terminal is a 2 GHz band/5 GHz band wireless LAN terminal which has a function to communicate with 40 MHz bandwidth based upon IEEE802.11n specification (draft version 2.0 and newer version).

A program of a nineteenth exemplary embodiment according to the present invention makes a computer execute a communication channel selecting method in which the radio communication terminal communicates within a predetermined communication area by selectively using a plurality of channels in a first predetermined band and in which the radio communication terminal communicates at high speed by using two consecutive channels. The program makes the computer execute a process to monitor a state of a surrounding radio wave, a process to determine whether or not the two consecutive channels can be used based on the monitoring result on the state of the radio wave, a process to select two separate channels when it is determined that the two consecutive channels cannot be used and a process to communicates by using the two separate channels.

A program of a twentieth exemplary embodiment according to the present invention makes a computer execute a process to communicate by selectively using a plurality of channels in a second predetermined band and a process to select two separate channels each of which are located in the first predetermined band and the second predetermined band respectively.

A program of a twenty-first exemplary embodiment according to the present invention makes a computer execute a process to transfer communication to a channel having no interfering radio wave to maintain the communication when the determining means determines that the interfering radio wave exists in at least one of two channels during communication by using the two channels.

A program of a twenty-second exemplary embodiment according to the present invention makes a computer execute a process to select a communication channel of a 2 GHz band wireless LAN terminal which has a function to communicate with 40 MHz bandwidth based upon IEEE802.11n specification (draft version 2.0 and newer version).

A program of a twenty-third exemplary embodiment according to the present invention makes a computer execute a process to select a communication channel of a 2 GHz band/5 GHz band wireless LAN terminal which has a function to communicate with 40 MHz bandwidth based upon IEEE802.11n specification (draft version 2.0 and newer version).

A storage medium of a twenty-fourth exemplary embodiment according to the present invention is a computer-readable storage medium in which the program according to any one of eighteenth to twenty-second embodiments of the present invention mentioned above is stored.

According to the embodiments described above, it is possible to reduce an interfering radio wave and to realize stable and high speed data communication with functions to monitor a state of communication with a surrounding radio communication terminal and to flexibly carry out channel selection.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A radio communication terminal, comprising:
   a communication unit which communicates using at least one channel in a first frequency band;
   a channel investigating unit which investigates all channels in said first frequency band, detects an available channel in said all channels and outputs a detection result as available channel information; and
   a channel setting unit which receives said available channel information, determines whether or not a plurality of channels adjacent to each other in said first frequency band are available for communication based on said available channel information, and sets a plurality of channels which are not adjacent to each other in said communication unit as channels which are available for communication in said first frequency band when it is determined that said plurality of channels adjacent to each other are not available for communication.

2. The radio communication terminal according to claim 1, wherein
   said channel setting unit determines that said plurality of channels which are adjacent to each other in said first frequency band are available for communication, and sets said plurality of channels which are adjacent to each other in said communication unit as channels to be used for communication in said first frequency band.

3. The radio communication terminal according to claim 1, wherein
   said channel setting unit determines that one available channel exists in said first frequency band, and sets said one channel in said communication unit as a channel to be used for communication in said first frequency band.

4. The radio communication terminal according to claim 1, wherein
   said channel setting unit determines that no available channel exists in said first frequency band, and sets one channel which includes the least amount of interference among said all channels in said first frequency band in said communication unit as a channel to be used for communication in said first frequency band.

5. The radio communication terminal according to claim 1, wherein
   said communication unit can communicates using at least one channel in a second frequency band in addition to said first frequency band, and said channel investigating unit investigates all channels of said second frequency band in addition to said first frequency band, detects an available channel in said all channels and outputs said detection result as available channel information.

6. The radio communication terminal according to claim 5, wherein
   said channel setting unit determines a channel to be used for communication in each of said first and said second frequency bands based on said available channel information and sets said channel in said communication unit.

7. The radio communication terminal according to claim 6, wherein
   said channel setting unit determines that a plurality of channels which are adjacent to each other in one frequency band of said first and said second frequency bands can not be used for communication, and sets a plurality of channels which are not adjacent to each other in said one frequency band in said communication unit as channels which are used for communication.

8. The radio communication terminal according to claim 7, wherein
said channel setting unit determines that said plurality of channels which are adjacent to each other in said one frequency band can be used for communication, and sets said plurality of channels which are adjacent to each other in said one frequency band in said communication unit as channels which are used for communication.

9. The radio communication terminal according to claim 6, wherein
said channel setting unit determines that only one available channel exists in one frequency band out of said first and said second frequency bands, selects at least one channel in other frequency band in addition to said one available channel, and sets each of said channels which are selected respectively in said first and said second frequency bands in said communication unit as channels which are used for communication.

10. The radio communication terminal according to claim 6, wherein
said channel setting unit determines that no available channel exists in one frequency band of said first and said second frequency bands, and determines whether or not a plurality of channels which are adjacent to each other in other frequency band can be used for communication.

11. The radio communication terminal according to claim 10, wherein
said channel setting unit determines that no available channel exists in said one frequency band of said first and said second frequency bands and a plurality of channels which are adjacent to each other in other frequency band can be used for communication, and sets said plurality of channels which are adjacent to each other in said other frequency band in said communication unit as channels which are used for communication.

12. The radio communication terminal according to claim 10, wherein
said channel setting unit determines that no available channel exists in said one frequency band of said first and said second frequency bands and a plurality of channels which are adjacent to each other in other frequency band cannot be used for communication, and sets a plurality of channels which are not adjacent to each other in said other frequency band in said communication unit as channels which is used for communication.

13. The radio communication terminal according to claim 10, wherein
said channel setting unit determines that no available channel exists in one frequency band of said first and said second frequency bands and a plurality of channels which are adjacent to each other in other frequency band can not be used for communication, and sets one available channel in said other frequency channel in said communication unit as a channel which is used for communication.

14. The radio communication terminal according to claim 6, wherein
said channel setting unit determines that no available channel exists in both said first frequency band and said second frequency band, and sets one channel which includes the least amount of interference among all channels in said first and said second frequency bands, to said communication unit as a channel which is used for communication.

15. The radio communication terminal according to claim 1, wherein
said channel investigating unit determines whether or not an interfering radio wave exists in at least one channel, while said communication unit communicates using a plurality of channels.

16. The radio communication terminal according to claim 15, wherein
when said channel investigating unit determines that said interfering radio wave exists in said at least one channel, said channel setting unit stops using said channel which is determined to include said interfering radio wave and sets a new channel including no interfering radio wave.

17. A radio communication terminal, comprising:
communication means for communicating using at least one channel in a first frequency band;
channel investigating means for investigating all channels in said first frequency band, detecting an available channel in all channels, and outputting said detection result as available channel information; and
channel setting means for receiving said available channel information, determining whether or not a plurality of channels which are adjacent to each other in said first frequency band can be used for communication based on said information and setting a plurality of channels which are not adjacent to each other as a channel to be used for communication in said first frequency band when it is determined that a plurality of channels adjacent to each other can not be used for communication.

18. A radio communication terminal, comprising:
a communication unit which is configured to communicate using a plurality of channels which are to be bonded for communication, said plurality of channels include at least two channels in a first frequency band, or at least two channels in a second frequency band, or at least one channel each in said first and said second frequency bands;
a channel investigating unit which is configured to investigate all channels in the frequency band to be used, to detect an available channel for communication in said all channels and to output available channel information as the detection result; and
a channel setting unit which is configured to receive said available channel information, to determine whether or not at least two channels are available for communication in said first frequency band based on said available channel information, to determine whether or not at least one each of channels are available for communication in said first and said second frequency bands based on said available channel information when it has been determined that at least two channels were not available for communication in said first frequency band, and to set said at least one each of channels in said first and said second frequency bands in said communication unit as channels to be bonded for communication when it has been determined that said at least one each of channels in said first and said second frequency bands were available for communication.

19. The radio communication terminal according to claim 18, wherein
said channel setting unit is further configured to determine whether or not at least two channels are available for communication in said second frequency band based on said available channel information when it has been determined that no channel was available for communication in said first frequency band, and to set at least two channels in said second frequency band in said communication unit as channels to be bonded for communication when it has been determined that said at least two channels in said second frequency band were available for communication, and wherein said at least two channels in said second frequency band are either of channels adjacent to each other or channels not adjacent to each other.

20. A channel selecting method in a radio communication terminal which communicates using a plurality of channels which are to be bonded for communication, said plurality of channels include at least two channels in a first frequency band, or at least two channels in a second frequency band, or at least one channel each in said first and said second frequency bands, the method comprising:

investigating all channels in the frequency band to be used, detecting an available channel for communication in said all channels and creating available channel information as the detection result;

determining whether or not at least two channels are available for communication in said first frequency band based on said available channel information;

determining whether or not at least one each of channels are available for communication in said first and said second frequency bands based on said available channel information when it has been determined that at least two channels were not available for communication in said first frequency band; and setting said at least one each of channels in said first and said second frequency bands in said communication unit as channels to be bonded for communication when it has been determined that said at least one each of channels in said first and said second frequency bands were available for communication.

21. The channel selecting method according to claim 20, further comprising:

determining whether or not at least two channels are available for communication in said second frequency band based on said available channel information when it has been determined that no channel was available for communication in said first frequency band; and setting at least two channels in said second frequency band in said communication unit as channels to be bonded for communication when it has been determined that said at least two channels in said second frequency band were available for communication, and wherein said at least two channels in said second frequency band are either of channels adjacent to each other or channels not adjacent to each other.

22. A non-transitory computer-readable storage medium which stores instructions to enable a computer to carry out a channel selecting method installed in a radio communication terminal which communicates using a plurality of channels which are to be bonded for communication, said plurality of channels include at least two channels in a first frequency band, or at least two channels in a second frequency band, or at least one channel each in said first and said second frequency bands, wherein said method comprising:

investigating all channels in the frequency band to be used, detecting an available channel for communication in said all channels and creating available channel information as the detection result;

determining whether or not at least two channels are available for communication in said first frequency band based on said available channel information;

determining whether or not at least one each of channels are available for communication in said first and said second frequency bands based on said available channel information when it has been determined that at least two channels were not available for communication in said first frequency band; and setting said at least one each of channels in said first and said second frequency bands in said communication unit as channels to be bonded for communication when it has been determined that said at least one each of channels in said first and said second frequency bands were available for communication.

* * * * *